US010001320B2

(12) United States Patent
Odawara et al.

(10) Patent No.: US 10,001,320 B2
(45) Date of Patent: Jun. 19, 2018

(54) LAMINATED STRUCTURE AND VACUUM INSULATING MATERIAL INCLUDING THE SAME

(71) Applicant: SAMSUNG ELECTRONICS CO., LTD., Suwon-si (KR)

(72) Inventors: Makoto Odawara, Yokohama (JP); Mitsuharu Kimura, Yokohama (JP); Kenichi Nagayama, Yokohama (JP)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days. days.

(21) Appl. No.: 14/981,217

(22) Filed: Dec. 28, 2015

(65) Prior Publication Data

US 2016/0187050 A1 Jun. 30, 2016

(30) Foreign Application Priority Data

Dec. 26, 2014 (JP) .................................. 2014-266580
Jul. 1, 2015 (KR) ........................ 10-2015-0093882

(51) Int. Cl.
| | | |
|---|---|---|
| *F25D 23/06* | (2006.01) | |
| *B32B 27/36* | (2006.01) | |
| *B32B 27/32* | (2006.01) | |
| *B32B 27/30* | (2006.01) | |
| *B32B 7/04* | (2006.01) | |
| *B32B 7/12* | (2006.01) | |
| *B32B 27/08* | (2006.01) | |
| *B32B 27/34* | (2006.01) | |
| *B32B 3/28* | (2006.01) | |
| *F16L 59/02* | (2006.01) | |
| *F16L 59/065* | (2006.01) | |
| *B32B 15/08* | (2006.01) | |

(52) U.S. Cl.
CPC .............. *F25D 23/065* (2013.01); *B32B 3/28* (2013.01); *B32B 7/045* (2013.01); *B32B 7/12* (2013.01); *B32B 27/08* (2013.01); *B32B 27/306* (2013.01); *B32B 27/32* (2013.01); *B32B 27/34* (2013.01); *B32B 27/36* (2013.01); *F16L 59/026* (2013.01); *F16L 59/065* (2013.01); *B32B 15/08* (2013.01); *B32B 2307/304* (2013.01); *B32B 2307/306* (2013.01); *B32B 2307/31* (2013.01); *B32B 2307/7242* (2013.01); *B32B 2457/00* (2013.01); *B32B 2509/00* (2013.01); *B32B 2509/10* (2013.01); *B32B 2607/00* (2013.01); *F25D 2201/14* (2013.01)

(58) Field of Classification Search
CPC .............. B32B 15/08; B32B 2307/304; B32B 2307/306; B32B 2307/31; B32B 2307/7242; B32B 2457/00; B32B 2509/00; B32B 2509/10; B32B 2607/00; B32B 27/08; B32B 27/306; B32B 27/32; B32B 27/34; B32B 27/36
See application file for complete search history.

(56) References Cited

U.S. PATENT DOCUMENTS

| | | | |
|---|---|---|---|
| 6,429,533 B1 * | 8/2002 | Li ......................... | H01C 1/1406 257/700 |
| 2003/0134078 A1 | 7/2003 | Urata et al. | |
| 2006/0141205 A1 | 6/2006 | Urata et al. | |
| 2006/0234006 A1 | 10/2006 | Tenra | |
| 2006/0263571 A1 | 11/2006 | Tsunetsugu et al. | |

FOREIGN PATENT DOCUMENTS

| | | |
|---|---|---|
| JP | 61-125577 | 6/1986 |
| JP | 09137889 | 5/1997 |
| JP | 3482408 | 12/2003 |
| JP | 3580315 | 10/2004 |
| JP | 2005114013 | 4/2005 |
| JP | 2008082416 | 4/2008 |
| JP | 4110674 | 7/2008 |
| JP | 4281502 | 6/2009 |
| JP | 4479027 | 6/2010 |
| KR | 1020110133384 | 1/2014 |

* cited by examiner

*Primary Examiner* — Lawrence Ferguson
(74) *Attorney, Agent, or Firm* — Cantor Colburn LLP

(57) ABSTRACT

A laminated structure includes a polymer layer comprising at least one layer, a gas barrier layer which has thermal resistance of greater than or equal to about 650 degrees Kelvin per watt and a Young's modulus of greater than or equal to about 100 gigapascals, and a position of a neutral axis represented by the following Equation 1 is in the gas barrier layer.

$$y = \frac{\sum_{i=1}^{n}(Ei \cdot Si)}{\sum_{i=1}^{n}(Ei \cdot Ai)}$$ (Equation 1)

In Equation 1, y denotes a distance from the top surface of a side compressed in bending to the neutral axis, Ei denotes a Young's modulus of the i-th layer, Si denotes a geometrical moment of area of the i-th layer, Ai denotes a cross-sectional area of the i-th layer, and n denotes a number of layers for the laminated structure, which is an integer of greater than or equal to 5.

9 Claims, 2 Drawing Sheets

LAMINATED STRUCTURE AND VACUUM INSULATING MATERIAL INCLUDING THE SAME

CROSS-REFERENCE TO RELATED APPLICATION

This application claims priority to Japanese Patent Application No. 2014-266580, filed on Dec. 26, 2014, and Korean Patent Application No. 10-2015-0093882, filed on Jul. 1, 2015, and all the benefits accruing therefrom under 35 U.S.C. § 119, the contents of which in their entirety are herein incorporated by reference.

BACKGROUND

1. Field

Exemplary embodiments of the invention relate to a laminated structure and a vacuum insulating material using the laminated structure as an exterior material. More particularly, exemplary embodiments of the invention relate to a laminated structure and a vacuum insulating material being capable of effectively reducing a heat bridge, having improved workability, and suppressing generation of pinholes and cracks.

2. Description of the Related Art

A vacuum insulating material is obtained by vacuum-packaging a core material or a gas adsorption agent in a gas barrier exterior material, and suppressing thermal conduction by maintaining the inside thereof under vacuum. The vacuum insulating material has been used in an electrical product such as a freezer, a refrigerator, a warmer cabinet, and a vending machine, a house wall material, or the like since it has a low thermal conductivity.

The gas barrier exterior material used for maintaining a vacuum degree inside the vacuum insulating material consists of a laminate structure of an aluminum foil and a plastic, in order to prevent gas invasion from the outside. However, since the aluminum has high thermal conductivity of 237 Watts per meter-Kelvin ("W/m·K"), a vacuum insulating material using the laminate structure as an exterior material has a large heat bridge through which heat inflows from peripheral parts along an exterior material part.

In order to reduce the heat bridge of a vacuum insulating material, a laminate structure of an aluminum deposition layer and a plastic has been used in one direction of an exterior material (e.g., refer to Patent Reference 1). In addition, in order to reduce thermal conductivity while maintaining gas barrier properties, a vacuum insulating material using a metal foil having low thermal conductivity (e.g., iron, lead, tin, stainless steel, and the like) instead of an aluminum foil in a gas barrier layer has been suggested (e.g., refer to Patent Reference 2).

(Patent Reference 1) Japanese Laid-open Publication Sho 61-125577

(Patent Reference 2) Japanese Laid-open Publication Pyong 9-137889

SUMMARY

An aluminum deposition layer disclosed in the Patent Reference 1 has low gas barrier properties and thus may not prevent gas invasion from the outside, and a vacuum degree inside the vacuum insulating material may not be maintained for a long time.

Since the metal foil in the Patent Reference 2 is manufactured by compressing, a metal foil of iron, lead, tin, stainless steel, and the like becomes thick at 20 micrometers (μm) (e.g., refer to paragraph 0010 of Patent Reference 2). This may cause a large heat bridge.

In addition, since the laminated structure of a metal foil with plastic has a large difference in Young's modulus between the metal foil and the plastic, it may cause workability problems in the bending process for fabricating the vacuum insulating material. In addition, stress is focused on the gas barrier layer, so pinholes or cracks are generated in the exterior material, causing problems of deteriorating the gas barrier property and the like.

The metal foil disclosed in the Patent Reference 2 has inferior workability due to its thickness, and it may be rigid and hard to handle when excessive heat seal parts that may inhibit flow during urethane encapsulation are folded.

Accordingly, considering the above problems, exemplary embodiments of the invention provides a laminated structure being capable of reducing a heat bridge, improving workability, and suppressing generation of pinholes or cracks, and a vacuum insulating material using the same.

In exemplary embodiments of the invention, the tasks may be accomplished by using a material having predetermined thermal resistance and Young's modulus as a laminated structure gas barrier layer for an exterior material of a vacuum insulating material and by controlling the layer structure to locate the kinetic neutral axis in the gas barrier layer.

In other words, the objective is achieved by providing a laminated structure including a polymer layer comprising at least one layer, a gas barrier layer, and a polymer layer comprising at least one layer in sequence and having a neutral axis represented by the following Equation 1 and positioned in the gas barrier layer, wherein an adhesive layer is interposed between each layer, and wherein the gas barrier layer has thermal resistance of greater than or equal to about 650 K/W and a Young's modulus of greater than or equal to about 100 gigapascals (GPa).

$$y = \frac{\sum_{i=1}^{n} (Ei \cdot Si)}{\sum_{i=1}^{n} (Ei \cdot Ai)} \quad \text{(Equation 1)}$$

In Equation 1, y denotes a distance from the top surface of a compressed side on the bending to the neutral axis, Ei denotes a Young's modulus of the i-th layer, Si denotes a geometrical moment of area of the i-th layer, Ai denotes an cross-sectional area of the i-th layer, and n denotes the number of layers for the laminated structure, which is an integer of greater than or equal to 5.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1A:
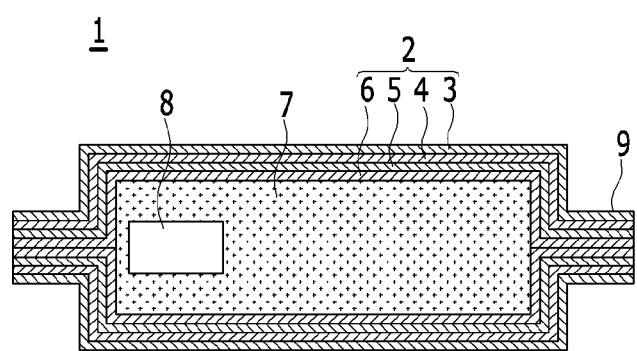
FIGS. 1A and 1B are schematic cross-sectional views showing an exemplary embodiment of a vacuum insulating material according to the invention.

The invention now will be described more fully hereinafter with reference to the accompanying drawings, in which various embodiments are shown. The invention may, however, be embodied in many different forms, and should not be construed as limited to the embodiments set forth herein. Rather, these embodiments are provided so that the invention will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which the invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Exemplary embodiments of the invention provide a laminated structure including a polymer layer comprising at least one layer, a gas barrier layer, and a polymer layer comprising at least one layer in sequence and having a neutral axis represented by the following Equation 1 and positioned in the gas barrier layer, where an adhesive layer is interposed between each layer, and where the gas barrier layer has thermal resistance of greater than or equal to about 650 degrees Kelvin per watt (K/W) and a Young's modulus of greater than or equal to about 100 gigapascals (GPa).

$$y = \frac{\sum_{i=1}^{n} (E_i \cdot S_i)}{\sum_{i=1}^{n} (E_i \cdot A_i)} \quad \text{(Equation 1)}$$

In Equation 1, y denotes a distance from the top surface of a compressed side on the bending to the neutral axis, Ei denotes a Young's modulus of the i-th layer, Si denotes a geometrical moment of area of the i-th layer, Ai denotes an cross-sectional area of the i-th layer, and n denotes the number of layers for the laminated structure, which is an integer of greater than or equal to 5.

According to exemplary embodiment of the invention, the laminated structure, which is an exterior material of a vacuum insulating material, has a kinetic neutral axis positioned in the gas barrier layer. By the structure, the gas barrier layer is hardly torn, and cracks or pinholes are hardly generated thereon even when compressed or bent.

In addition, by controlling the thermal resistance and the Young's modulus of the gas barrier layer within the predetermined range, the heat bridge of the exterior material may be effectively reduced, and the workability thereof is improved as well.

Conventionally, in order to maintain a high vacuum degree in the vacuum insulating material, the gas barrier layer has been a cheap aluminum foil having high gas barrier properties. However, since the aluminum has high thermal conductivity even among metals, it causes problems in that heat is returned along the exterior material of the vacuum insulating material (heat bridge).

In addition, when fabricated by compression, it is difficult to reduce the thickness to lower than or equal to about 7 micrometers (μm) due to the pinholes or the tensile strength problems, resulting in a limit of increasing the thermal resistance.

In order to solve the problems, it is considered to substitute the aluminum foil with a deposition film or a metal foil having low thermal conductivity. However, the deposition film has a lack of a gas barrier property for maintaining the vacuum degree in the vacuum insulating material. Furthermore, even when the aluminum foil is substituted with another metal foil having low thermal conductivity, it is difficult to provide a foil having a thickness of lower than or equal to about 10 μm by the compression, and also since the Young's modulus of the metal foil is significantly different from the Young's modulus of plastic to be laminated with the metal foil, it may cause problems in that the workability is deteriorated during the bending process for fabricating the vacuum insulating material, and stress is focused on the gas barrier layer, so the gas barrier layer is broken, and the like.

Thereby, according to one embodiment, the gas barrier layer, which is an exterior material for a laminated structure, includes a material having high thermal resistance, and the layer structure is designed to locate the kinetic neutral axis thereof in the gas barrier layer.

The neutral axis is an axis which does not bear a load when it is bent, and the load is further increased farther from the neutral axis.

According to one embodiment, even when compressing or bending, the gas barrier layer is stressed as little as possible, so as to obtain a laminated structure and a vacuum insulating material having excellent bending resistance.

Accordingly, the vacuum insulating material using the laminated structure according to exemplary embodiments of the invention may reduce the heat bridge and improve the workability and also suppress the generation of pinholes or cracks. Thereby, a vacuum insulating material using the laminated structure according to exemplary embodiments of the invention may be usefully applied as a vacuum insulating material of a refrigerator, a freezer, and the like, for example.

Hereinafter, exemplary embodiments of the invention are described.

However, the invention is not limited to only the following exemplary embodiments.

In addition, for better understanding and the ease of description, the dimensional ratios are exaggerated in the drawings, so may be different from actual ratios.

In this disclosure, "weight" and "mass", "wt %" and "mass %", and "parts by weight" and "parts by mass" are considered to be synonyms.

Furthermore, unless defined otherwise, the operating and measuring properties and the like are performed under the conditions of room temperature of about 20 degrees Celsius (° C.) to about 25° C. and relative humidity of about 40 percent (%) to 50%.

Figure 1B:
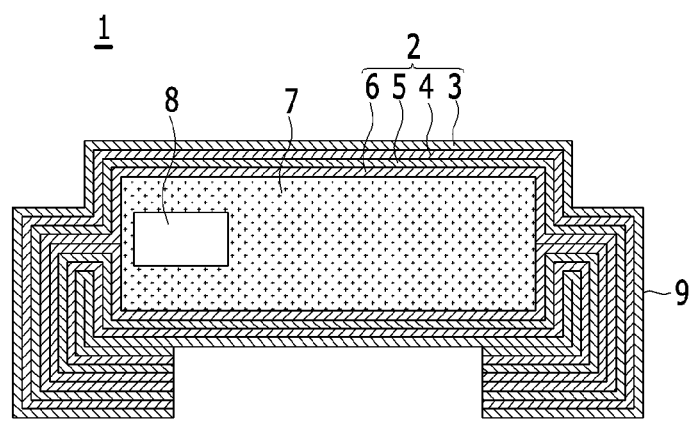

FIGS. 1A and 1B are schematic cross-sectional views showing one example of a vacuum insulating material according to one embodiment.

As shown in FIG. 1A, the vacuum insulating material 1 has a structure in which a core material 7 and a gas adsorption agent 8 are enveloped by a laminated structure 2, which includes two sheets of exterior materials, from both surfaces thereof. The laminated structure 2 (laminated film) includes at least a gas barrier layer 4 and polymer layers 3, 5, and 6, where at least one polymer layer is laminated on each of both surface of the gas barrier layer 4, and preferably, a total of three or more layers are laminated (e.g., a total of three layers in FIGS. 1A and 1B).

Further, the gas barrier layer 4 and the polymer layers 3, 5, and 6 are attached to each other by interposing an adhesive layer (not shown).

As described above, by providing the gas barrier layer 4 having the above predetermined level of thermal resistance, the heat returned from the surroundings along the laminated structure 2 may be suppressed to a low level. Thereby, the heat bridge may be effectively suppressed and/or prevented by using the laminated structure 2 according to exemplary embodiments of the invention.

The vacuum insulating material 1 is obtained by sealing (e.g., heat sealing) the surroundings of the laminated structure 2 to provide an envelope-shaped exterior material, accommodating the core material 7 and the gas adsorption agent 8 in the laminated structure 2 and lowering the inside pressure as it is, and sealing (e.g., heat sealing) the opening thereof.

Thus, as shown in FIGS. 1A and 1B, a bonding part (also referred to as "seal part") 9 where the laminated structures are bonded to each other is disposed at the edge of the laminated structure 2. The bonding part 9 is bent toward the main body side of the vacuum insulating material, and thus a vacuum insulating material product is provided, as shown in FIG. 1B.

Hereinafter, each member of the vacuum insulating material according to one embodiment is described.

However, the invention includes a laminated structure as an exterior material and the other members may include any conventional members, and are not limited to as follows.

Figure 2:
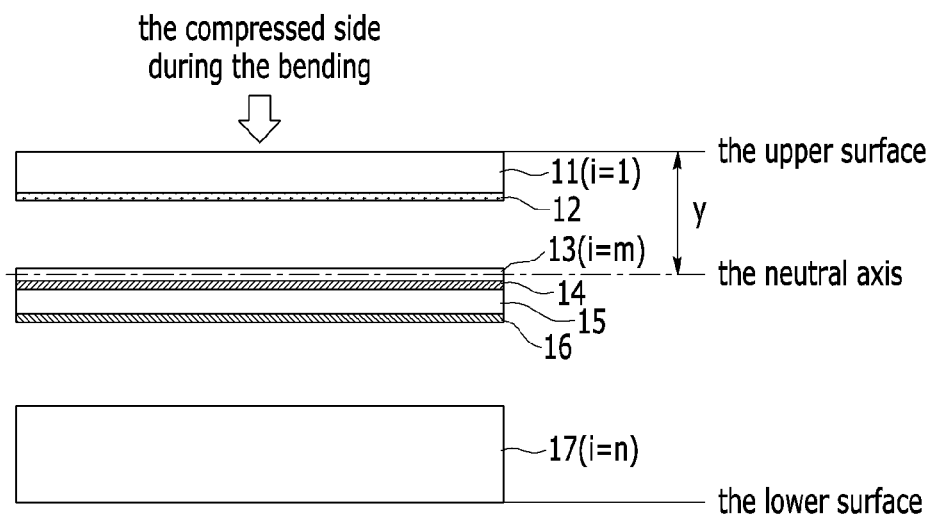
FIG. 2 is a schematic cross-sectional view showing an exemplary embodiment of a laminated structure according to the invention.

As shown in FIG. 2, the exterior material is a laminated structure sequentially including at least one layered polymer layer 11, a gas barrier layer 13, and at least one of layered polymer layers 15 and 17, where each of the layers are laminated by interposing adhesive layers 12, 14, and 16.

In the laminated structure according to exemplary embodiments of the invention, the gas barrier layer has thermal resistance of greater than or equal to about 650 K/W.

In addition, in the laminated structure including the gas barrier layer having a Young's modulus of greater than or equal to about 100 GPa, the neutral axis of the laminated structure is positioned in the gas barrier layer (refer to FIG. 2).

According to exemplary embodiments of the invention, the core material and the gas adsorption agent are enclosed by a pair of exterior materials having a gas barrier property from both surfaces thereof and sealed by lowering the internal pressure to provide a vacuum insulating material, where at least one of the pair of exterior materials having a gas barrier property includes the laminated structure. Desirably, both exterior materials are the laminated structures.

In this case, when the total number of laminated layers is n, and when the gas barrier layer is an m-th layer from the top surface of the laminated structure on the compressed side during the bending, the 1st, the 3rd, . . . , the m−2th, the m+2th, the m+4th, . . . , and the n-th layers are polymer layers.

From the top surface of laminated structure on the compressed side during the bending, the 2nd, the 4th, . . . , the m−1th, the m+1th, the m+3th, . . . , and the n−1th layers are adhesive layers.

In this case, the number n refers to an integer of greater than or equal to 5, desirably, an integer ranging from 5 to 13, for example. The number m refers to an integer of greater than or equal to 3, desirably, an integer ranging from 3 to 7, for example.

The position of the neutral axis may be calculated from the Young's modulus and the thickness of each polymer layer and gas barrier layer according to the following Equation 1.

$$y = \frac{\sum_{i=1}^{n}(Ei \cdot Si)}{\sum_{i=1}^{n}(Ei \cdot Ai)} \quad \text{(Equation 1)}$$

In Equation 1, y denotes a distance from the top surface of the compressed side on the bending to the neutral axis, Ei denotes a Young's modulus of the i-th layer, Si denotes a geometrical moment of area of the i-th layer, Ai denotes a cross-sectional area of the i-th layer, and n denotes an integer of greater than or equal to 5.

The position of the neutral axis does not follow the bending and compressing conditions but may employ the position of the neutral axis when bending under the conditions according to the following examples.

In the laminated structure according to exemplary embodiments of the invention, the neutral axis may be controlled to be in the gas barrier layer by adjusting the material, the thickness, the number of laminations, the order of lamination, or the like of the polymer layers laminated on the both surfaces of the gas barrier layer to achieve the stress balance. In other words, the layer structure may be designed with the Young's modulus and the thickness of each layer.

In addition, as shown in FIGS. 1A and 1B, each of the polymer layers 3, 5, and 6 on both sides of the gas barrier layer 4 has a form of a monolayer and a double layer, but each of the polymer layers may be a monolayer or a laminated layer of two or more kinds.

The laminated structure according to exemplary embodiments of the invention desirably has low thermal conductivity considering the thermal resistance. Thereby, the gas barrier layer also desirably has low thermal conductivity. Specifically, the thermal conductivity of the gas barrier layer is desirably less than or equal to about 130 Watts per meter-Kelvin (W/m·K), and more desirably, less than or equal to about 100 W/m·K. When the thermal conductivity is less than or equal to about 130 W/m·K, it has excellent superior heat bridge suppressing effect compared to the conventional compressed aluminum foil.

As it is desirable for the gas barrier layer to have lower thermal conductivity, a lower limit is not particularly cited, but generally it is sufficient when greater than or equal to about 10 W/m·K or when greater than or equal to about 20 W/m·K. The laminated structure having the thermal conductivity has excellent heat resistance as an exterior material.

The thermal conductivity of the gas barrier layer may be measured according to a known measuring method, but in exemplary embodiments of the invention, the thermal conductivity of gas barrier layer may be measured according to the method described in the following examples.

As described above, by using the laminated structure according to exemplary embodiments of the invention, the heat bridge problem is solved.

Considering the heat bridge suppressing effect, the laminated structure is desirably thin and desirably has the low thermal conductivity.

Considering this point, the gas barrier layer is required to have the thermal resistance above the predetermined level, so the gas barrier layer capable of being applied to the laminated structure according to exemplary embodiments of the invention may have thermal resistance of greater than or equal to about 650 K/W. In an exemplary embodiment, the gas barrier layer may have thermal resistance of greater than or equal to about 750 K/W, for example, thermal resistance of greater than or equal to about 1000 K/W, and for another example, thermal resistance of greater than or equal to about 1500 K/W. When the gas barrier layer has the thermal resistance of less than about 650 K/W, the effects on suppressing the heat bridge are insufficiently obtained.

It is more desirable as the thermal resistance of gas barrier layer is higher, so the upper limit is not particularly restricted, but generally, it is sufficient when it is less than or equal to about 20,000 K/W, or it may be even less than or equal to about 10,000 K/W.

Particularly, the laminated structure including a gas barrier layer having thermal resistance of greater than or equal to about 650 K/W and simultaneously having a thickness of less than or equal to about 10 μm may ensure the excellent workability and effectively suppression or prevention of the heat bridge generation compared to the case of including the conventional aluminum foil.

In the invention, the thermal resistance of the gas barrier layer refers to the thermal resistance perpendicular to the thickness direction of the gas barrier layer per unit area, and the thermal resistance (K/W) may be obtained from a thickness measured in terms of meter (m) and a thermal conductivity (W/m·K) of the gas barrier layer, and may be calculated from, specifically, the following Equation 2.

Thermal resistance (K/W) of gas barrier layer=1 (m)/[thermal conductivity (W/m·K) of gas barrier layer×1(m)×thickness (m) of gas barrier layer] (Equation 2)

In an exemplary embodiment, the thickness of the gas barrier layer is not particularly limited, but may range, for example, from about 0.1 μm to about 6 μm. More particularly, it may range, for example, from about 0.1 μm to about 4 μm, for example, from about 0.3 μm to about 3 μm, and particularly, for example, from about 0.5 μm to about 2 μm.

When the thickness of the gas barrier layer is greater than or equal to about 0.1 μm, it may ensure a sufficient gas barrier property. In addition, when the thickness of the gas barrier layer is less than or equal to about 6 μm, the thermal resistance is sufficiently increased, so the heat bridge in which heat flows along the surface of the vacuum insulating material may be effectively suppressed and/or prevented to improve the heat insulation property. In addition, since it has excellent workability such as a bending property, the bonding part of the exterior material is easily closely contacted to the main body of the vacuum insulating material.

In the exemplary embodiment of the invention, the thickness of the gas barrier layer refers to the maximum thickness.

In addition, as in the above, the gas barrier layer having the laminated structure according to exemplary embodiments of the invention has a Young's modulus of greater than or equal to about 100 GPa. Since the metal having a Young's modulus of greater than or equal to about 100 GPa is rigid so is brittle, the laminated structure using the metal as a gas barrier layer is easily torn or generates cracks and pinholes by the bending process, so that the gas barrier property may be significantly deteriorated.

However, by controlling the neutral axis to be located in the gas barrier layer, the obtained laminated structure according to exemplary embodiments of the invention may have excellent bending resistance even when using the gas barrier layer having a Young's modulus of greater than or equal to about 100 GPa.

The gas barrier layer material is not particularly limited as long as it has the ranged thermal resistance and the ranged Young's modulus.

In an exemplary embodiment, the material may include a meal foil including a metal such as iron (Young's modulus: about 192 GPa), copper (Young's modulus: about 130 GPa), nickel (Young's modulus: about 200 GPa), SUS (Young's modulus: about 199 GPa), titanium (Young's modulus: about 107 GPa), platinum (Young's modulus: about 168 GPa), cobalt (Young's modulus: about 209 GPa), carbon steel (Young's modulus: about 206 GPa), or the like and/or an alloy including the metal, or a metal, metal oxide or semiconductor oxide deposition film including a deposition film including at least one of nickel, copper, silicon oxide, alumina, magnesium oxide, titanium oxide, and the like and/or an alloy deposition film including the metal, for example.

Among them, the metal foil may be usable as it is easily formed in a thin film and has an excellent gas barrier property even though it is thin.

In the laminated structure according to exemplary embodiments of the invention, the gas barrier layer may be an electrodeposited metal foil. Particularly, since the electrodeposited metal foil is easily formed in a thin film and has an excellent gas barrier property even though it is thin, it is easy to contact the bonding part to the main body of the vacuum insulating material. Thereby, even in the state of bending the bonding part, the heat bridge in which heat flows along the surface of the vacuum insulating material is effectively suppressed and/or prevented, so as to improve the heat insulation performance and simultaneously to provide a vacuum insulating material with an excellent gas barrier property and high reliability.

Herein, a method of manufacturing the electrodeposited metal foil is not particularly limited, but may be a conventional method (a method of electrodepositing a metal in a revolving drum) or an appropriate modification method thereof. Alternatively, the electrodeposited metal foil may be commercially available.

A method of manufacturing a metal foil is broadly classified into a rolling method of repeatedly rolling and annealing an electroplated metal (e.g., electroplated copper) into a thin film and the electrodeposition method. Whether the metal foil is manufactured in the rolling method or in the electrodeposition method may be examined hereinafter.

A metal foil manufactured in the electrodeposition method has dense particles, and the particles grow in a thickness direction of the foil, while a metal foil manufactured in the rolling method has large particles, and the particles are elongated in a plane direction of the foil through a rolling operation. In addition, the electrodeposited metal foil shows high surface roughness compared with the rolled metal foil due to the manufacturing process.

In an exemplary embodiment, the electrodeposited metal foil has surface roughness ranging from about 0.05 μm to about 3 μm, specifically, from about 0.05 μm to about 2.5 μm, and more specifically, from about 0.05 μm to about 2 μm, for example.

In an exemplary embodiment, the metal foil may have any composition and is not particularly limited, but it may include a metal, for example, nickel, iron, copper, or the like, having a Young's modulus of greater than or equal to about 100 GPa.

The metal foil may be a metal foil including one kind of metal, or may be an alloy foil including an alloy of two or more kinds of metals. In an exemplary embodiment, the metal foil includes nickel. That is, the metal foil may be a nickel foil or an alloy foil including nickel, for example.

In addition, the alloy composition constituting an alloy foil as a metal foil is not particularly limited, but may be desirably selected considering the thermal conductivity, the ease of controlling a metal foil thickness, thermal resistance, or the like. In an exemplary embodiment, when the metal foil is a nickel alloy foil (alloy foil including nickel), nickel may be included at greater than or equal to 1 wt %, for example, greater than or equal to about 10 wt %, based on the total weight of the metal foil (total weight of metals for the metal foil). The upper limit of the nickel composition is not particularly limited, but may be less than or equal to about 50 wt % based on the metal foil (total weight of metals for the metal foil). The composition may impart the sufficient low thermal conductivity and the sufficient high thermal resistance (i.e., excellent heat insulation) and the high gas barrier properties.

The gas barrier layer is laminated with polymer layers on both surfaces thereof while interposing an adhesive layer to provide a laminated structure according to exemplary embodiments of the invention. In addition, the composition of the polymer layer is not particularly limited, but may include a film having a thermal bonding property as a polymer layer 6 (refer to FIGS. 1A and 1B) on the inner side of the gas barrier layer (the side accommodating the core material or the gas adsorption agent). In addition, the polymer layer 3 (refer to FIGS. 1A and 1B) on the outer side (in contact with the ambient air) of the gas barrier layer may be a film having a surface protecting effect (also referred to as "surface protective film"). In addition, the polymer layer 5 (refer to FIGS. 1A and 1B), which is a film having a surface protecting effect, may be further provided even on the inner side of the gas barrier layer.

In an exemplary embodiment, the laminated structure may be formed by subsequently laminating at least a first polymer layer having a Young's modulus of about 5 megapascals (MPa) to about 100 MPa and a heat sealing property, a second polymer layer having a Young's modulus of about 3 GPa to about 5 GPa, a gas barrier layer having a Young's modulus of about 100 GPa to about 300 GPa, and a third polymer layer having a Young's modulus of about 1 GPa to about 3 GPa while interposing an adhesive layer between each of the layers.

With the structure, the stress influencing the laminated structure is easily balanced, so that the effects of the invention may be significantly obtained.

In this case, when the laminated structure is used as the exterior material, the first polymer layer may be disposed at the inner side (where it accommodates a core material or a gas adsorption agent).

The polymer having a heat sealing property, which is usable as a first polymer layer (thermal bonding film), is not particularly limited as long as it may be attached by the commonly-used heat sealing method.

In an exemplary embodiment, a material of the first polymer layer (thermal bonding film) may be, for example, a polyolefin such as low density polyethylene, linear low density polyethylene, high density polyethylene, polypropylene, and the like, a thermoplastic resin such as an ethylene-vinyl acetate copolymer, an ethylene-methacrylic acid copolymer, an ethylene-methacrylic acid ester copolymer, an ethylene-acrylic acid ester copolymer, a polyacrylonitrile, and the like. Among the above described elements, in the view of cost, a melting temperature, and a laminating strength, polyethylene may be used.

The material may be used singularly or as a combination of two or more kinds thereof.

The first polymer layer (thermally bonding film) may be a single layer or a laminate of two or more layers. When the first polymer layer is a laminate of two or more layers, each layer may have the same composition or different compositions.

In an exemplary embodiment, the first polymer layer (thermally bonding film) may be a non-elongated film, or may be a uniaxially or biaxially elongated film.

A thickness of the first polymer layer (thermally bonding film) is not particularly limited, and may be, for example, about 30 µm to about 80 µm. When the thickness of the first polymer layer is greater than or equal to about 30 µm, it is easy to control the neutral axis of the laminated structure to be in the gas barrier layer. In addition, the sufficient attaching strength may be obtained during the heat sealing. When the first polymer layer (thermally bonding film) has a thickness of less than or equal to about 80 µm, the workability such as the bending property and the like is excellent.

When the thermally bonding film has a laminate structure of two or more layers, the thickness of the thermally bonding film means the total thickness. The thickness of each layer may be the same or different in this case.

The Young's modulus of first polymer layer (thermally bonding film) is not particularly limited, but may range from about 5 MPa to about 100 MPa. When the Young's modulus is greater than or equal to about 5 MPa, it is easy to control the neutral axis of the laminated structure to be in the gas barrier layer. When the Young's modulus is less than or equal to about 100 MPa, the workability such as the bending property is excellent.

When the thermally bonding film has a laminated structure of two or more layers, at least one layered thermally bonding film may have the ranged Young's modulus, or, for example, all thermally bonding films may have the ranged Young's modulus.

The second polymer layer may be a polymer layer having a Young's modulus of about 3 GPa to 5 GPa. By providing a structure in which the gas barrier layer is disposed between the second polymer layer having a Young's modulus of about 3 GPa to about 5 GPa and the later-described third polymer layer (surface protective film), it is easy to control the neutral axis of the laminated structure to be in the gas barrier layer.

In an exemplary embodiment, a material of the second polymer layer may be, for example, a polyester such as polyethylene terephthalate ("PET"), polyethylene naphthalate ("PEN"), and polybutylene terephthalate ("PBT"), a polyolefin such as polyethylene ("PE"), polypropylene ("PP"), and polystyrene ("PS"), polyimide, polyacrylate, polyvinyl chloride ("PVC"), polyvinylidene chloride ("PVDC"), an ethylene vinyl alcohol copolymer ("EVOH"), a polyvinyl alcohol resin ("PVA"), polycarbonate ("PC"), polyether sulfone ("PES"), polymethyl methacrylate ("PMMA"), polyacrylonitrile resin ("PAN"), and the like. Among them, particularly, in the view of the cost, the gas barrier property, and the like, polyethylene terephthalate ("PET") or an ethylene vinyl alcohol copolymer ("EVOH") may be used.

In an exemplary embodiment, these films may include several additives or stabilizers, for example, an antistatic agent, an ultraviolet ("UV") blocking agent, a plasticizer, a lubricant, and the like.

The material may be used singularly or as a combination of two or more kinds thereof.

The second polymer layer may be a single layer or a laminate of two or more layers. In the latter case, each layer may have the same composition or different compositions.

The second polymer layer may be a non-elongated film, or may be a uniaxially or biaxially elongated film, but may desirably be an elongated film. By the elongation, the strength is enhanced, and the Young's modulus is increased. In addition, it may be a thin film, and the workability may be improved.

In an exemplary embodiment, a thickness of the second polymer layer is not particularly limited, and may be about 10 µm to about 30 µm, for example. Within the range, it is easy to balance the stress influencing the laminated structure and to control the neutral axis of the laminated structure to be in the gas barrier layer. Furthermore, the workability such as the bending property may be improved.

When the second polymer layer has a laminate structure of two or more layers, the thickness of the layer means the total thickness. The thickness of each layer may be the same or different in this case.

When the second polymer layer has a two- or more-layered laminate structure, at least one layer may have the ranged Young's modulus, or all layers may have the ranged Young's modulus.

The third polymer layer (surface protective film) is not particularly limited, and may include the same material as the commonly-used for the surface protective film of the exterior material. The material of the surface protective film may include, for example, nylon-6, nylon-66, and the like, or polyamide (nylon) ("PA") having a protection effect against piercing, in the view of suppressing the exterior material from being sheared.

In an exemplary embodiment, these films may include several additives or stabilizers, for example, an antistatic agent, an UV blocking agent, a plasticizer, a lubricant, and the like. The materials may be used singularly or as a combination of two or more kinds thereof.

The surface protective film may be a single layer or a laminate of two or more layers. In the latter case, each layer may have the same composition or a different composition.

In an exemplary embodiment, the third polymer layer may be a non-elongated film, or may be a uniaxially or biaxially elongated film, but may desirably be an elongated film. By the elongation, the strength may be enhanced, and the Young's modulus may be increased. In addition, it may be formed as a thin film so that the workability may be improved. In addition, it may enhance the effects of protecting from piercing or the like.

A thickness of the third polymer layer (surface protective film) is not particularly limited, and may be the same as a known thickness. In an exemplary embodiment, the surface protective film may have a thickness ranging from about 10 µm to about 30 µm, for example. When the thickness of the third polymer layer is less than about 10 µm, the barrier layer is not sufficiently protected and cracks and the like may be generated. In addition, when the thickness of the third polymer layer is greater than about 30 µm, the workability such as the bending property is deteriorated.

When the third polymer layer (surface protective film) has a laminate structure of two or more layers, the thickness of the layer means the total thickness. The thickness of each layer may be the same or different in this case.

The Young's modulus of the third polymer layer (surface protective film) is not particularly limited, but it may range from about 1 GPa to about 3 GPa. When the Young's modulus is greater than or equal to about 1 GPa, it is easy to control the neutral axis of the laminated structure to be in the gas barrier layer. When the Young's modulus is less than or equal to about 3 GPa, the workability such as the bending property may be enhanced.

When the third polymer layer (surface protective film) has a laminate structure of two or more layers, at least one layered surface protective film may have the ranged Young's modulus, or all surface protective films may have the ranged Young's modulus.

An adhesive layer is provided between the polymer layer and the gas barrier layer and between each of the polymer layers. The adhesive layer may attach the polymer layer to the gas barrier layer, or may be between the polymer layers.

The adhesive agent usable for the adhesive layer is not particularly limited, and may include a urethane-based adhesive, a polyacrylic acid ester-based adhesive, a cyano acrylate-based adhesive, a silicone-based adhesive, or the like. Among them, it may include, particularly, a urethane-based adhesive, and more preferably, may include a two-component curable isocyanate-based adhesive in which a main component agent (polyol) and a hardener (polyisocyanate) are mixed. By using the urethane-based adhesive, the pinhole is hardly generated even when carrying out the distortion process, and the heat insulation effect on the vacuum insulating material may be maintained for a long time.

The adhesive usable for each adhesive layer may be same or different.

The Young's modulus of the adhesive layer is not particularly limited, but may be less than or equal to about 10 MPa in the view of easily controlling the position of the neutral axis of the laminated structure.

In an exemplary embodiment, the thickness of adhesive layer is not particularly limited, but may be in a range, for example, from about 1 μm to about 5 μm. Within the range, it is easy to control the neutral axis of the laminated structure to be in the gas barrier layer. The thickness of each adhesive layer may be same or may be different.

The thickness of the laminated structure is not particularly limited.

In an exemplary embodiment, the thickness of the laminated structure ranges, for example, from about 40 μm to about 210 μm.

When the laminated structure has the thickness, the heat bridge may be effectively suppressed or prevented so that the heat insulation performance may be improved, and also the gas barrier property and the workability may be improved.

The laminated structure according to exemplary embodiments of the invention may have an excellent gas barrier property. Specifically, the laminated structure may have water vapor transmittance of less than or equal to about $1 \times 10^{-3}$ gram per square meter per day (g/m$^2$·day), for example, less than or equal to about $5 \times 10^{-4}$ g/m$^2$·day.

When the laminated structure has the water vapor transmittance of less than or equal to about $1 \times 10^{-3}$ g/m$^2$·day, it may maintain the vacuum degree in the vacuum insulation material including the same as the exterior material for a long time.

It is more desirable as the laminated structure has lower water vapor transmittance, so the lower limit thereof is not particularly restricted, but it is generally sufficient when it is greater than or equal to about $1 \times 10^{-7}$ g/m$^2$·day.

In an exemplary embodiment, the water vapor transmittance after the bending may be less than or equal to about $1 \times 10^{-3}$ g/m$^2$·day, for example, less than or equal to about $5 \times 10^{-4}$ g/m$^2$·day.

In the invention, the water vapor transmittance of the laminated structure and the water vapor transmittance after the bending of the laminated structure are measured according to the methods of the later-described examples.

In addition, the laminated structure according to exemplary embodiments of the invention desirably has low thermal conductivity considering the heat insulation. Also, the vacuum insulating material including the laminated structure as an exterior material may have low thermal conductivity.

Specifically, the vacuum insulating material (exterior material) may have thermal conductivity of less than or equal to about 0.01 W/m·K, for example, less than or equal to about 0.005 W/m·K. With the thermal conductivity range, the vacuum insulating material may have excellent heat insulation performance.

Since the lower thermal conductivity is more desirable, the vacuum insulating material (exterior material) has no particular limit to a lowest thermal conductivity, but the thermal conductivity may be greater than or equal to about 0.0005 W/m·K.

The thermal conductivity of the vacuum insulating material (exterior material) may be measured in a known method, but the vacuum insulating material is measured in exemplary embodiments of the invention according to a method described in the following examples.

In an exemplary embodiment, the thermal conductivity difference of the vacuum insulating material before and after the accelerated deterioration test may be less than or equal to about 10 milliWatts per meter-Kelvin (mW/m·K), specifically, less than or equal to about 5 mW/m·K, more specifically, less than or equal to about 2 mW/m·K, and more specifically, less than or equal to about 1.5 mW/m·K.

In the invention, the thermal conductivity difference of the vacuum insulation material before and after carrying out the accelerated degradation test may be measured in accordance with the method described in the following examples.

The method of manufacturing a vacuum insulating material is not particularly limited, but may be in accordance with the same method as the public knowledge or the appropriately modified method from the disclosed method. In an exemplary embodiment, the method may include (i) preparing two sheets of laminated structures, folding one of the laminated structure (laminate film) and heat-bonding between thermal bonding films disposed in the ends of laminated structures facing each other to provide an envelope-shaped exterior material, and injecting a core material and a gas adsorption agent into the exterior material and heat bonding between the thermally bonding films disposed in the opening of the envelope-shaped laminate film under the reduced pressure, or (ii) disposing two sheets of laminated structures (laminate films) to face the thermal bonding films to each other, heat-bonding between the thermally bonding films disposed in the ends of each laminated structure to provide an envelope-shaped exterior material, injecting a core material and a gas adsorption agent into the envelope-shaped exterior material, and heat bonding between the thermal bonding films disposed around the opening of the envelope-shaped laminate film under the reduced pressure, for example.

The core material used in exemplary embodiments of the invention becomes a framework of a vacuum insulating material to provide a vacuum space. Herein, the core material is not particularly limited, and may include any known core material. In an exemplary embodiment, the core material may include an inorganic fiber such as glass wool, rock wool, alumina fiber, a metal fiber including a metal having low thermal conductivity, and the like, an organic fiber such as a synthetic fiber like polyester or polyamide, acryl, polyolefin, and the like, a cellulose manufactured from wood pulp, a natural fiber such as cotton, hemp, cloth, wool, silk, and the like, a recycled fiber such as rayon and the like, a semi-synthetic fiber such as acetate and the like, and the like, for example.

The core materials may be used alone or as a combination of two or more. Among these materials, the glass wool may be used. The core material including these materials has high elasticity and low thermal conductivity of the fiber itself, and a low cost for industrial use.

The gas adsorption agent in exemplary embodiments of the invention adsorbs gasses such as vapor or air (oxygen and nitrogen) remaining in or entering the closely sealed spaced of the vacuum insulating material. The gas adsorption agent is not particularly limited, but may include any known gas adsorption agents.

In an exemplary embodiment, the gas adsorption agent may include a chemical adsorption material such as calcium oxide (quick lime) and magnesium oxide, a physical adsorption material such as zeolite, funnel urethane, a lithium compound, a chemical adsorptive and physical adsorptive copper ion exchange ZSM-5 type of zeolite, a 13× molecular sieve, or the like, for example.

The gas adsorption agent may be used singularly or as a combination of two or more kinds thereof.

As described above, the laminated structure of exemplary embodiments of the invention may effectively suppress generation of a heat bridge, improve workability, and suppress generation of pinholes or cracks.

Accordingly, the vacuum insulation material of exemplary embodiments of the invention may be appropriately employed for a device required to maintain the heat insulation performance, for example, a freezer, a refrigerator, a vending machine, a hot water supply, a heat insulation material for a building, a heat insulation material for an automobile, a thermostatic box, or the like.

The effects of the invention are described referring to the following examples and comparative examples. However, the technical scope of the invention is not limited to the following examples. In an exemplary embodiment, the operation is performed at room temperature of 25° C. unless mentioned otherwise. Also, unless mentioned otherwise, "%" and "part" respectively refer to "wt %" and "parts by weight".

Example 1

From the surface protective film (upper surface) to the thermally bonding film (lower surface), sequentially, a third polymer layer of biaxial elongation nylon (thickness: 25 µm, Young's modulus: 1.4 GPa), a gas barrier layer of nickel electrolytic metal foil (thickness: 1 µm, thermal resistance: 11,173 K/W, Young's modulus: 200 GPa), a second polymer layer of a dual axis elongation ethylene vinyl alcohol copolymer (thickness: 12 µm, Young's modulus: 4 GPa), and a first polymer layer of linear low density polyethylene film (thickness: 50 µm, Young's modulus: 10 MPa) are attached by interposing an adhesive layer of a two-component curable isocyanate-based adhesive (thickness: 3 µm, Young's modulus: 3.1 MPa) with the dry laminate to provide a first laminated structure.

A laminated structure of single fiber glass wool is used as the core material, and quick lime is used as the gas adsorption agent enclosed in the air-permeable exterior material. The first laminated structure, the core material, and the gas adsorption agent are used to provide a first vacuum insulating material having a size of a width of 290 millimeters (mm)×a depth of 410 mm×a height of 12 mm.

Example 2

A second laminated structure and a second vacuum insulating material are fabricated in accordance with the same procedure as in Example 1, except the nickel electrolytic metal foil has a thickness of 3 µm.

Example 3

A third laminated structure and a third vacuum insulating material are fabricated in accordance with the same procedure as in Example 1, except that the biaxial elongation ethylene vinyl alcohol copolymer is substituted with biaxial elongation polyethylene terephthalate (thickness: 12 µm, Young's modulus: 3.4 GPa) as the second polymer layer.

Example 4

A fourth laminated structure and a fourth vacuum insulating material are fabricated in accordance with the same procedure as in Example 3, except the nickel electrolytic metal foil has a thickness of 3 µm.

Comparative Example 1

A fifth laminated structure and a fifth vacuum insulating material are manufactured in accordance with the same procedure as in Example 3, except that biaxial elongation nylon (thickness: 25 µm, Young's modulus: 1.4 GPa), biaxial elongation polyethylene terephthalate (thickness: 12 µm, Young's modulus: 3.4 GPa), a gas barrier layer of rolled aluminum foil (thickness: 7 µm, thermal resistance: 602 K/W, Young's modulus: 69 GPa), and linear low density polyethylene film (thickness: 50 µm, Young's modulus: 10 MPa) are sequentially laminated from the upper surface to the lower surface of the laminated structure.

Comparative Example 2

A sixth laminated structure and a sixth vacuum insulating material are manufactured in accordance with the same procedure as in Example 3, except that biaxial elongation nylon (thickness: 25 µm, Young's modulus: 1.4 GPa), biaxial elongation polyethylene terephthalate (thickness: 12 µm, Young's modulus: 3.4 GPa), VM-PET (thickness: 12 µm), and linear low density polyethylene film (thickness: 50 µm, Young's modulus: 10 MPa) are sequentially laminated from the upper surface to the lower surface of the laminated structure.

Herein, VM-PET is obtained by providing an Al deposition film having a thickness of 30 nm on the polyethylene terephthalate having a thickness of 12 µm, and the Al deposition film is laminated on the surface of the biaxial elongation polyethylene terephthalate.

Comparative Example 3

A seventh laminated structure and a seventh vacuum insulating material are manufactured in accordance with the same procedure as in Example 3, except that biaxial elongation polyethylene terephthalate (thickness: 12 µm, Young's modulus: 3.4 GPa), biaxial elongation nylon (thickness: 25 µm, Young's modulus: 1.4 GPa), a gas barrier layer of nickel electrolytic metal foil (thickness: 1 µm, thermal resistance: 11,173 K/W, Young's modulus: 200 GPa), and a linear low density polyethylene film (thickness: 50 µm, Young's modulus: 10 MPa) are sequentially laminated from the upper surface to the lower surface of the laminated structure.

The first to seventh obtained laminated structures and first to seventh vacuum insulating materials are evaluated as follows.

<Evaluation 1: Position of Neutral Axis>

The position of the neutral axis of each of the first to seventh laminated structures obtained from Examples 1 to 4 and Comparative Examples 1 to 3 may be calculated using the following Equation 1. The position of the neutral axis is represented by a distance (µm) from the surface protective film side (upper side).

$$y = \frac{\sum_{i=1}^{n} (Ei \cdot Si)}{\sum_{i=1}^{n} (Ei \cdot Ai)} \quad \text{(Equation 1)}$$

Herein, y is a distance (µm) from the upper surface on the compressed side during the bending to the neutral axis, Ei is a Young's modulus (Pa) of an i-th layer, Si is a geometrical moment of area (µm$^3$), and Ai is the cross-sectional area (µm$^2$) of the i-th layer. The results are shown in the following Table 1.

The bending compression is performed by bending the laminated structure to contact the two ends of the upper surface of laminated structure (surface of biaxial elongation nylon side) with each other and then unfolding the same and bending again to the opposite side.

<Evaluation 2: Water Vapor Transmittance Before and After Bending>

The first to seventh laminated structures obtained from Examples 1 to 4 and Comparative Examples 1 to 3 are measured for the water vapor transmittance in g/m$^2$·day before and after the bending according to the following method.

The term "after the bending" means after bending the sample, which is measured before the bending, in a cross.

The water vapor transmittance is measured at a relative humidity of 90% and a temperature of 40° C. and using Aquatran (manufactured by MOCON) based on ISO15106-3.

The results are shown in the following Table 1.

<Evaluation 3: Thermal Conductivity and Thermal Resistance of Gas Barrier Layer>

The gas barrier layers (metal part) used in Examples 1 to 4 and Comparative Examples 1 to 3 are measured for the thermal diffusion rate in the surface inside direction using a Thermowave Analyzer (manufactured by Japanese Arc), and the thermal conductivity (W/m·K) is calculated from specific heat and density of each metal. In addition, the thermal resistance (K/W) is calculated from the obtained thermal conductivity and thickness.

The results are shown in the following Table 1.

<Evaluation 4: Heat Insulation Maintaining Performance of Vacuum Insulating Material>

The first to seventh vacuum insulating materials obtained from Examples 1 to 4 and Comparative Examples 1 to 3 are each measured for thermal conductivity (mW/m·K) using HFM436 (manufactured by NETZSCH) at an early stage and after performing an acceleration test corresponding to 10 years in a thermo-hygrostat, and the heat insulation maintaining performance is compared from the difference therebetween. The results are shown in the following Table 1:

<Evaluation 5: Heat Bridge Performance of Vacuum Insulating Material>

The first to seventh vacuum insulating materials obtained from Examples 1 to 4 and Comparative Examples 1 to 3 are measured for thermal conductivity (mW/m·K) using a heat flow meter HFM436 (manufactured by NETZSCH) by inserting two vacuum insulating materials from both sides and disposing two vacuum insulating materials to be contacted at the center of measuring part, and the heat bridge performance is compared. The results are shown in the following Table 1:

TABLE 1

| | Neutral axis position of laminated structure | Aqueous vapor transmittance of laminated structure (g/m$^2$ · day) | | Thermal conductivity of gas barrier layer (W/m · K) | Thermal resistance of gas barrier layer (K/W) | Thermal conductivity difference of vacuum insulating material (mW/m · K) | Heat bridge performance of vacuum insulating material (mW/m · K) |
|---|---|---|---|---|---|---|---|
| | | Before folding | After folding | | | | |
| Ex. 1 | 28.2 µm (in nickel) | <5 × 10$^{-4}$ | <5 × 10$^{-4}$ | 89.5 | 11,173 | 1.3 | 2.2 |
| Ex. 2 | 28.5 µm (in nickel) | <5 × 10$^{-4}$ | <5 × 10$^{-4}$ | 89.5 | 3724 | 1.2 | 2.6 |
| Ex. 3 | 29.4 µm (in nickel) | <5 × 10$^{-4}$ | <5 × 10$^{-4}$ | 89.5 | 11,173 | 1.3 | 2.1 |
| Ex. 4 | 29.5 µm (in nickel) | <5 × 10$^{-4}$ | <5 × 10$^{-4}$ | 89.5 | 3724 | 1.3 | 2.7 |
| Comp. Ex. 1 | 43.2 µm (in aluminum) | <5 × 10$^{-4}$ | <5 × 10$^{-4}$ | 237 | 602 | 1.2 | 3.6 |
| Comp. Ex. 2 | 35.0 µm (in polyethylene terephthalate) | 4.2 × 10$^{-2}$ | 9.1 × 10$^{-1}$ | 237 | 42,194 | 15.9 | 2.0 |
| Comp. Ex. 3 | 34.3 µm (in nylon) | <5 × 10$^{-4}$ | 5.5 × 10$^{-2}$ | 89.5 | 11,173 | 11.7 | 2.2 |

As shown in Table 1, the laminated structures according to Examples 1 to 4, including the gas barrier layer having the predetermined thermal resistance and Young's modulus and having the kinetic neutral axis positioned in the gas barrier layer, have effects of suppressing the heat bridge compared to the laminated structure according to Comparative Example 1 including the gas barrier layer having thermal resistance of less than 650 K/W.

In addition, compared to the laminated structures according to Comparative Examples 2 and 3 in which the kinetic neutral axis is positioned in another layer, not in the gas barrier layer, it is confirmed that the laminated structures according to Examples 1 to 4 have the excellent gas barrier property even after the bending in an equivalent level to that before the bending and have high durability (bending resistance).

While exemplary embodiments of the invention have been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A laminated structure comprising at least one polymer layer, a gas barrier layer, and an adhesive layer interposed between the at least one polymer layer and the gas barrier layer, wherein the gas barrier layer has thermal resistance of greater than or equal to about 650 degrees Kelvin per watt and a Young's modulus of greater than or equal to about 100 gigapascals, and wherein a neutral axis represented by the following Equation 1 is positioned in the gas barrier layer:

$$y = \frac{\sum_{i=1}^{n}(Ei \cdot Si)}{\sum_{i=1}^{n}(Ei \cdot Ai)} \quad \text{(Equation 1)}$$

where, in Equation 1, y denotes a distance from a top surface of a side compressed on bending to the neutral axis, Ei denotes a Young's modulus of an i-th layer, Si denotes a geometrical moment of area of the i-th layer, Ai denotes a cross-sectional area of the i-th layer, and n denotes a number of layers for the laminated structure, which is an integer of greater than or equal to 5.

2. The laminated structure of claim 1, wherein the gas barrier layer comprises a metal foil.

3. The laminated structure of claim 2, wherein the metal foil is an electrolytic metal foil.

4. The laminated structure of claim 2 or claim 3, wherein the metal foil has a thickness of about 0.1 micrometer to about 6 micrometers.

5. The laminated structure of claim 2 or claim 3, wherein the metal foil is a nickel foil.

6. The laminated structure of any one of claim 1 to claim 3, wherein at least a first polymer layer having a Young's modulus of about 5 MPa to about 100 MPa and having a heat sealing property, a second polymer layer having a Young's modulus of about 3 gigapascals to about 5 gigapascals, the gas barrier layer having a Young's modulus of about 100 gigapascals to about 300 gigapascals, and a third polymer layer having a Young's modulus of about 1 gigapascals to about 3 gigapascals are sequentially laminated while interposing the adhesive layer between the first to third polymer layers and the gas barrier layer.

7. The laminated structure of claim 6, wherein the first polymer layer comprises polyethylene.

8. The laminated structure of claim 6, wherein the second polymer layer comprises polyethylene terephthalate or an ethylene vinyl alcohol copolymer.

9. The laminated structure of claim 6, wherein the third polymer layer comprises nylon.

* * * * *